US012656726B2

(12) United States Patent
Wang

(10) Patent No.: US 12,656,726 B2
(45) **Date of Patent: *Jun. 16, 2026**

(54) DEVELOPING CARTRIDGE INCLUDING MOVABLE SHAFT, AND CAM PROVIDED ON SHAFT AND HAVING SURFACE INCLINED RELATIVE THERETO

(71) Applicant: BROTHER KOGYO KABUSHIKI KAISHA, Nagoya (JP)

(72) Inventor: Yuwen Wang, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/962,331

(22) Filed: Nov. 27, 2024

(65) Prior Publication Data

US 2025/0093812 A1 Mar. 20, 2025

Related U.S. Application Data

(63) Continuation of application No. 18/190,295, filed on Mar. 27, 2023, now Pat. No. 12,169,385.

(30) Foreign Application Priority Data

Apr. 1, 2022 (JP) ................................ 2022-061485

(51) Int. Cl.

*G03G 21/16* (2006.01)
*G03G 15/08* (2006.01)
*G03G 21/18* (2006.01)

(52) U.S. Cl.

CPC ....... *G03G 21/1647* (2013.01); *G03G 15/087* (2013.01); *G03G 21/1676* (2013.01);
(Continued)

(58) Field of Classification Search

CPC ............. G03G 21/1647; G03G 15/087; G03G 21/1676; G03G 21/1821; G03G 21/1864; G03G 2221/1657
See application file for complete search history.

(56) References Cited

U.S. PATENT DOCUMENTS 12,169,385 B2 * 12/2024 Wang ................ G03G 21/1821
2017/0184998 A1 6/2017 Itabashi
(Continued)

FOREIGN PATENT DOCUMENTS

JP 2017-116826 A 6/2017
JP 2019-179128 A 10/2019
JP 2021-103222 A 7/2021

OTHER PUBLICATIONS

International Search Report and Written Opinion issued in corresponding International Patent Application No. PCT/ JP2023/ 012157, May 16, 2023.

*Primary Examiner* — Sandra Brase
(74) *Attorney, Agent, or Firm* — Merchant & Gould P.C.

(57) ABSTRACT

A developing cartridge includes a housing, a developing roller, a shaft, a first cam, and an elastic member. The housing has a first outer surface at one end portion of the housing in a first direction. The developing roller is rotatable about a first axis extending in the first direction. The shaft is along a second axis extending in the first direction. The shaft is movable in the first direction relative to both the housing and the developing roller. The first cam is at one end portion of the shaft in the first direction. The first cam is movable in the first direction together with the shaft. The elastic member is positioned outward of the shaft in a radial direction of the shaft. The elastic member is positioned between the first outer surface and the first cam in the first direction.

18 Claims, 10 Drawing Sheets

(52) U.S. Cl.
CPC ..... *G03G 21/1821* (2013.01); *G03G 21/1864* (2013.01); *G03G 2221/1657* (2013.01)

(56) References Cited

U.S. PATENT DOCUMENTS

| | | | |
|---|---|---|---|
| 2018/0284690 | A1 | 10/2018 | Mizutani |
| 2019/0302674 | A1 | 10/2019 | Wang et al. |
| 2019/0302682 | A1 | 10/2019 | Wang et al. |
| 2021/0157262 | A1 | 5/2021 | Haruta |
| 2021/0200135 | A1 | 7/2021 | Ikegami et al. |

* cited by examiner

DEVELOPING CARTRIDGE INCLUDING MOVABLE SHAFT, AND CAM PROVIDED ON SHAFT AND HAVING SURFACE INCLINED RELATIVE THERETO

REFERENCE TO RELATED APPLICATIONS

This application is a continuation of U.S. patent application Ser. No. 18/190,295, filed Mar. 27, 2023, now U.S. Pat. No. 12,169,385, which claims priority from Japanese Patent Application No. 2022-061485 filed on Apr. 1, 2022. The entire content of the priority applications is incorporated herein by reference.

BACKGROUND ART

There have conventionally been known electro-photographic image-forming apparatuses such as laser printers and LED printers. Such image-forming apparatuses use a developing cartridge. The developing cartridge extends in the first direction and includes a developing roller for supplying toner. The conventional image-forming apparatuses include a drawer unit. The drawer unit is configured to be attached to the image-forming apparatus. The drawer unit includes a photosensitive drum. The developing cartridge is configured to be attached to the drawer unit. When the developing cartridge is attached to the drawer unit, the developing roller comes into contact with the photosensitive drum.

The conventional image-forming apparatus is switchable between a state in which the developing roller and the photosensitive drum are in contact with each other, and a state in which the developing roller and the photosensitive drum are separated from each other. The developing cartridge further includes a shaft movable in the first direction, a cam positioned at one end portion of the shaft in the first direction, and an elastic member positioned between the shaft and the cam in the first direction. When the cam receives a pressing force in the first direction by the image-forming apparatus, the shaft and the cam move in the first direction, enabling to move the developing cartridge between the contact state and the separated state.

DESCRIPTION

It is conceivable that the shaft and the cam are integrally formed for stably moving the developing cartridge between the contact state and the separated state. However, there have been no conventional technologies of arranging an elastic member in a configuration in which the shaft and the cam are integrally formed.

In view of the foregoing, it is an object of the present disclosure to provide a developing cartridge in which a shaft and a cam are integrally formed and an elastic member can be arranged.

In order to attain the above and other objects, according to one aspect, the present disclosure provides a developing cartridge including a housing, a developing roller, a shaft, a first cam, an elastic member. The housing is configured to accommodate developer therein. The housing has a first outer surface. The first outer surface is positioned at one end portion of the housing in a first direction. The developing roller is rotatable about a first axis extending in the first direction. The developing roller is positioned at one end portion of the housing in a second direction. The shaft is along a second axis extending in the first direction. The shaft is movable in the first direction relative to both the housing and the developing roller. The first cam is positioned at one end portion of the shaft in the first direction. The first cam is movable in the first direction together with the shaft. The first cam is formed integrally with the shaft. The first cam has a first inclined surface. The elastic member is configured to be expanded or compressed. The elastic member is positioned outward of the shaft in a radial direction of the shaft. The elastic member is positioned between the first outer surface and the first cam in the first direction.

Hereinafter, embodiments of the present disclosure will be described with reference to the accompanying drawings.

In the following description, the direction in which a developing roller extends will be called a "first direction". The direction in which one end of a casing at which the developing roller is positioned and another end of the casing are aligned will be called a "second direction". The first direction and the second direction cross each other (and preferably perpendicular to each other). A direction crossing (and preferably perpendicular to) both the first direction and the second direction will be called a "third direction". The direction in which a first cam body part extends will be called a "fourth direction". The fourth direction is perpendicular to the first direction and crosses both the second direction and the third direction.

1. Structure of Image-Forming Apparatus

Figure 1:
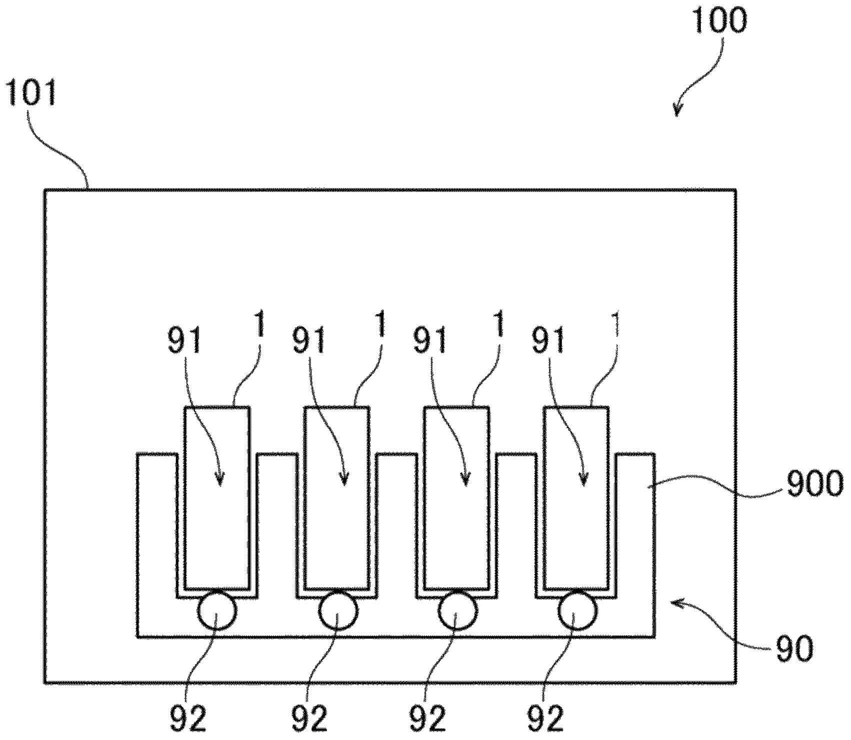
FIG. 1 is a schematic view of an image-forming apparatus.

FIG. 1 is a schematic view of an image-forming apparatus 100. The image-forming apparatus 100 is an electro-photographic printer. Examples of the image-forming apparatus 100 include a laser printer and an LED printer.

The image-forming apparatus 100 includes a plurality of developing cartridges 1, a drawer unit 90, and a body frame 101.

Each of the developing cartridges 1 is attachable to the drawer unit 90. The drawer unit 90 is a drum cartridge to which the developing cartridges 1 are configured to be attached. The plurality of developing cartridges 1 is attachable to the drawer unit 90. In the present embodiment, the number of the developing cartridges 1 is four. The drawer unit 90 includes a frame 900. The frame 900 has a plurality of slots 91. In the present embodiment, the number of the slots 91 is four. Each of the developing cartridges 1 is configured to be attached to the corresponding slot 91. The drawer unit 90 further includes a plurality of photosensitive drums 92. In the present embodiment, the number of the photosensitive drums 92 is four. The photosensitive drum 92 is provided for each of the four slots 91.

The drawer unit 90 has the four slots 91 and includes the four photosensitive drums 92. Accordingly, the four developing cartridges 1 are configured to be attached to the drawer unit 90 in the image-forming apparatus 100. The developing cartridges 1 are configured to be attached in the body frame 101 in a state where the developing cartridges 1 are attached to the drawer unit 90.

Figure 2:
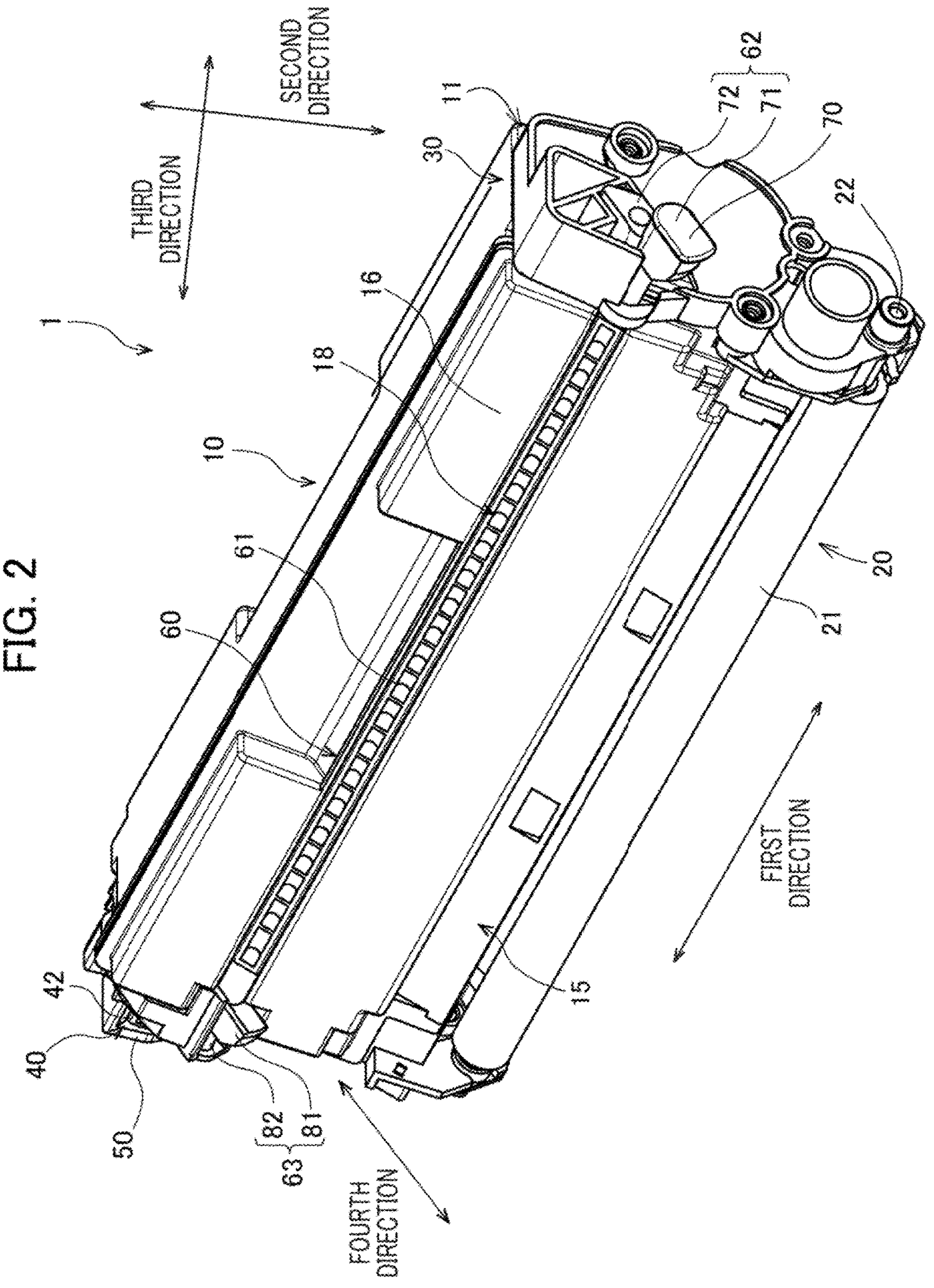
FIG. 2 is a perspective view of a developing cartridge.
Figure 3:
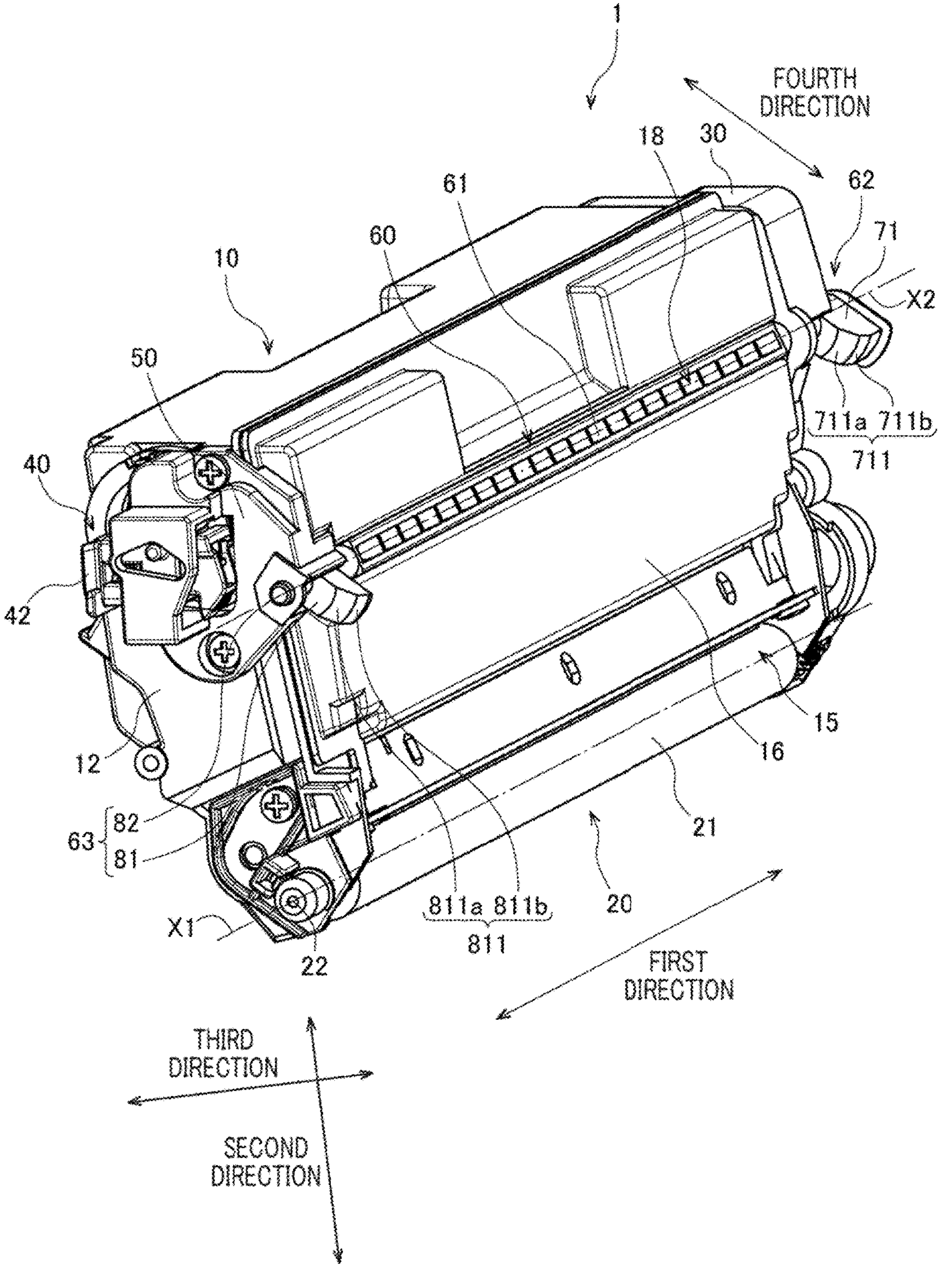
FIG. 3 is another perspective view of the developing cartridge.

Each of the developing cartridges 1 includes a developing roller 20 extending in the first direction (see FIGS. 2 and 3). Each of the photosensitive drums 92 is rotatable about a rotational axis (a drum axis) extending in the first direction. In a state where the developing cartridge 1 is attached in the slot 91 of the drawer unit 90, a surface of the developing roller 20 faces a surface of the photosensitive drum 92. The drawer unit 90 is configured to be attached to the body frame 101 (see FIG. 1) in a state where the developing cartridges 1 are attached to the corresponding slots 91.

The four developing cartridges 1 accommodate developer (for example, toner) in mutually different colors (for example, the colors cyan, magenta, yellow, and black). The plurality of developing cartridges 1, however, may accommodate developer of the same color. The number of the developing cartridges 1 may be one, two, or three, or five or more.

The image-forming apparatus 100 can form images on printing sheets using the developer supplied from the four developing cartridges 1.

2. Developing Cartridge

Figure 4:
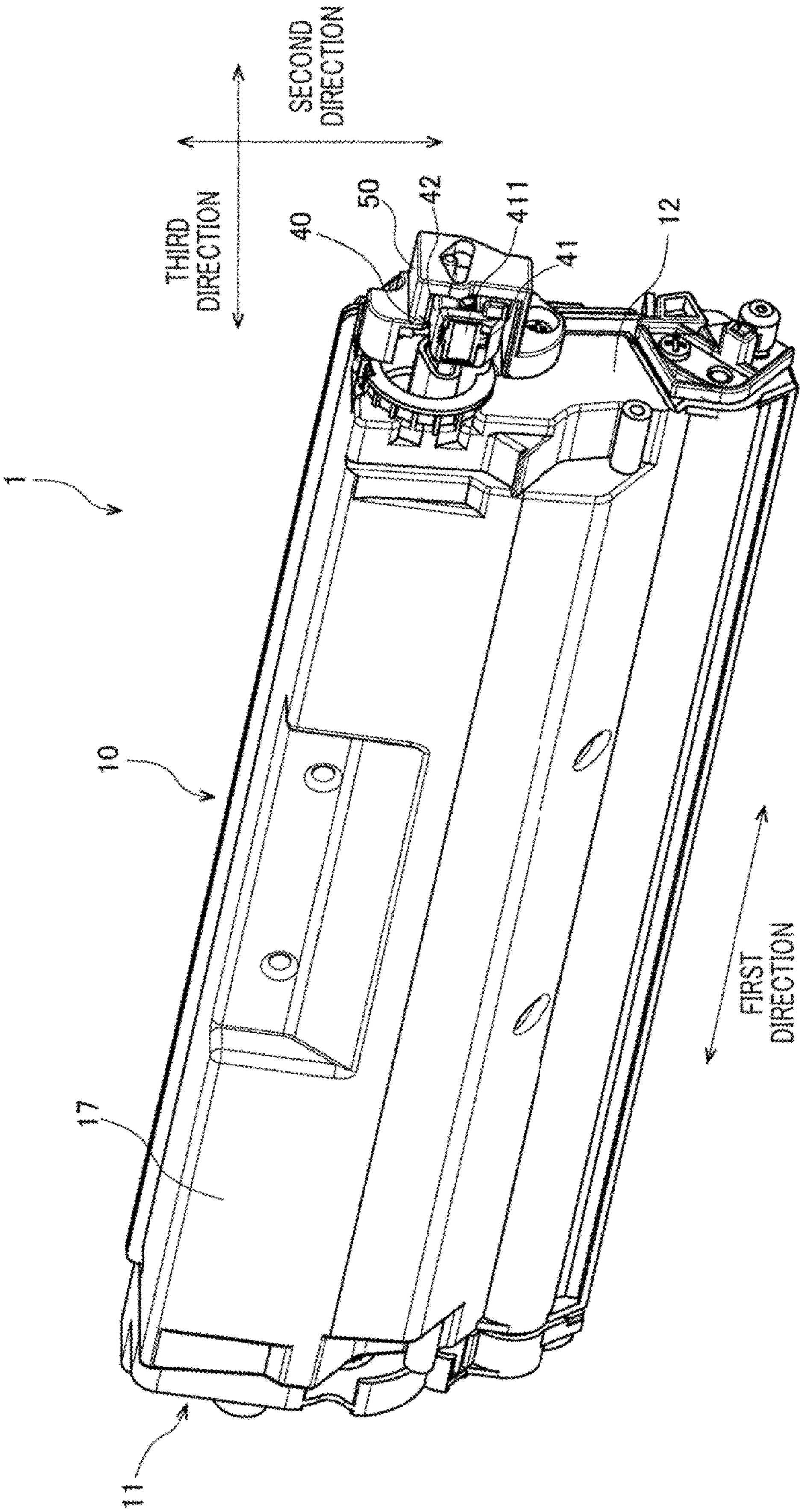
FIG. 4 is another perspective view of the developing cartridge.
Figure 5:
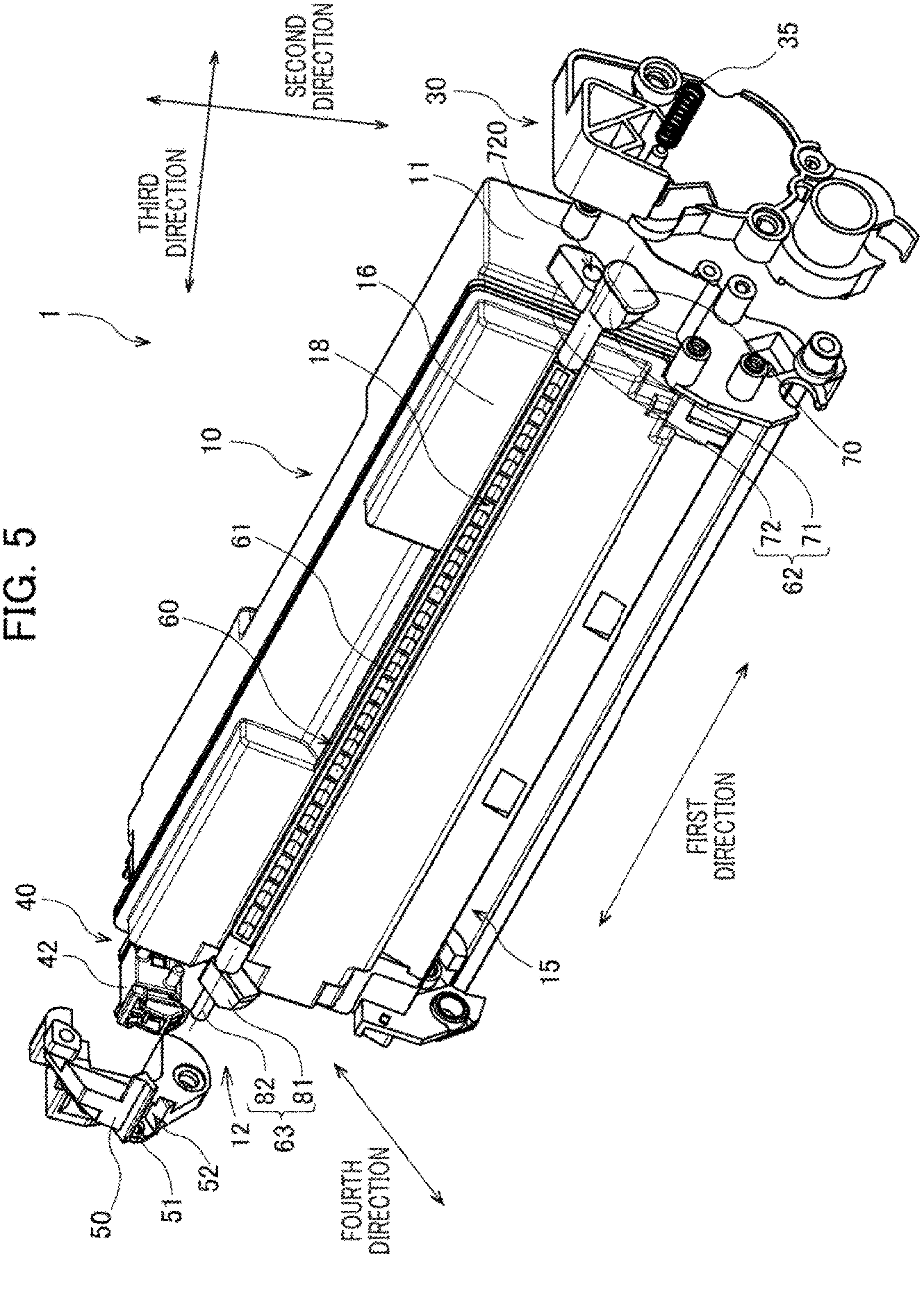
FIG. 5 is an exploded perspective view of the developing cartridge.

FIGS. 2 through 4 are perspective views of the developing cartridge 1. FIG. 5 is an exploded perspective view of the developing cartridge 1.

As illustrated in FIGS. 2 through 5, each of the developing cartridges 1 in the present embodiment includes a casing 10, the developing roller 20, a gear cover 30, a coil spring 35, an IC-chip assembly 40, a holder cover 50, and a separating member 60.

The casing 10 is a housing that can accommodate developer (for example, toner) for electro-photographic printing. The casing 10 has a first outer surface 11 and a second outer surface 12. The first outer surface 11 and the second outer surface 12 are positioned apart from each other in the first direction. The casing 10 extends in the first direction. The first outer surface 11 is positioned at one end portion of the casing 10 in the first direction, and the second outer surface 12 is positioned at another end portion of the casing 10 in the first direction. The gear cover 30 is positioned at the first outer surface 11. The IC-chip assembly 40 and the holder cover 50 are positioned at the second outer surface 12.

The developing roller 20 is a roller that is rotatable about a first axis X1 extending in the first direction. The developing roller 20 includes a roller body 21 and a roller shaft 22. The roller body 21 is a cylindrical member that extends in the first direction. An elastic rubber is used as the material of the roller body 21, for example. The roller shaft 22 is a columnar member that penetrates through the roller body 21 in the first direction. A metal or conductive resin is used as the material of the roller shaft 22.

Note that the roller shaft 22 need not necessarily penetrate through the roller body 21 in the first direction. For example, a pair of roller shafts 22 may extend in the first direction from both ends of the roller body 21 in the first direction.

The casing 10 has an opening 15. The opening 15 provides communication between the interior space of the casing 10 and the outside of the casing 10. The opening 15 is positioned at one end portion of the casing 10 in the second direction. The developing roller 20 is positioned at the opening 15. That is, the developing roller 20 is positioned at the one end portion of the casing 10 in the second direction. One side portion of the circumferential surface of the developing roller 20 in the second direction is exposed to the outside of the casing 10. Another side portion of the outer circumferential surface of the developing roller 20 in the second direction is positioned inside the casing 10.

The roller body 21 is fixed to the roller shaft 22 so as not to be rotatable relative to the roller shaft 22. Further, a developing gear (not shown) is fixed to one end portion of the roller shaft 22 in the first direction so as not to be rotatable relative to the roller shaft 22. Hence, when the developing gear rotates, the roller shaft 22 also rotates. The roller shaft rotates together with the roller body 21.

When the developing cartridge 1 receives a driving force, a supply roller (not shown) supplies developer accommodated in the casing 10 to the outer circumferential surface of the developing roller 20. At this time, the developer is triboelectrically charged between the supply roller and the developing roller 20. In the meantime, a bias voltage is applied to the roller shaft 22 of the developing roller 20. Accordingly, the electrostatic force generated between the roller shaft 22 and the developer attracts developer to the outer circumferential surface of the roller body 21.

Each of the developing cartridges 1 further includes a layer-thickness regulation blade (not shown). The layer-thickness regulation blade regulates the thickness of a layer of the developer supplied on the outer circumferential surface of the roller body 21 at a uniform thickness. The developer on the outer circumferential surface of the roller body 21 is then supplied to the photosensitive drum 92 of the drawer unit 90. At this time, the developer is transferred from the roller body 21 onto the photosensitive drum 92 in accordance with an electrostatic latent image formed on the outer circumferential surface of the photosensitive drum 92. Accordingly, the electrostatic latent image formed on the outer circumferential surface of the photosensitive drum 92 becomes a visible image.

As illustrated in FIG. 2, the gear cover 30 is positioned at the first outer surface 11 of the casing 10. Accordingly, the gear cover 30 covers a plurality of gears (not shown) that are rotatably mounted on the first outer surface 11 of the casing 10. Also, the gear cover 30 covers at least a portion of the first outer surface 11.

As illustrated in FIGS. 3 and 4, the IC-chip assembly 40 and the holder cover 50 are positioned at the second outer surface 12 of the casing 10. As illustrated in FIG. 4, the IC-chip assembly 40 includes an IC chip 41 that is a storage medium, and a holder 42 that holds the IC chip 41. The holder cover 50 covers at least a portion of the holder 42.

The holder 42 is positioned at the second outer surface 12 of the casing 10. The holder 42 is held by the holder cover 50. Various information on the developing cartridge 1 is recorded on the IC chip 41. The IC chip 41 has an electrical contact surface 411. The electrical contact surface 411 is made of a metal that is a conductor. In the present embodiment, the direction orthogonal to both the first direction and the second direction will be called the "third direction". The IC chip 41 is fixed to an outer surface of the holder 42 in the third direction. More specifically, the IC chip 41 is fixed to an outer surface of one end portion of the holder 42 in the third direction. That is, the holder 42 holds the electrical contact surface 411. Also, the holder 42 is movable relative to the casing 10 together with the electrical contact surface 411.

The drawer unit 90 includes electrical connectors. Each of the electrical connectors is made of a metal, for example. When each developing cartridge 1 is attached to the drawer unit 90, the corresponding electrical connector comes into contact with the electrical contact surface 411 of the developing cartridge 1, thereby enabling the image-forming apparatus 100 to perform at least one of reading information from the IC chip 41 and writing information to the IC chip 41.

Figure 6:
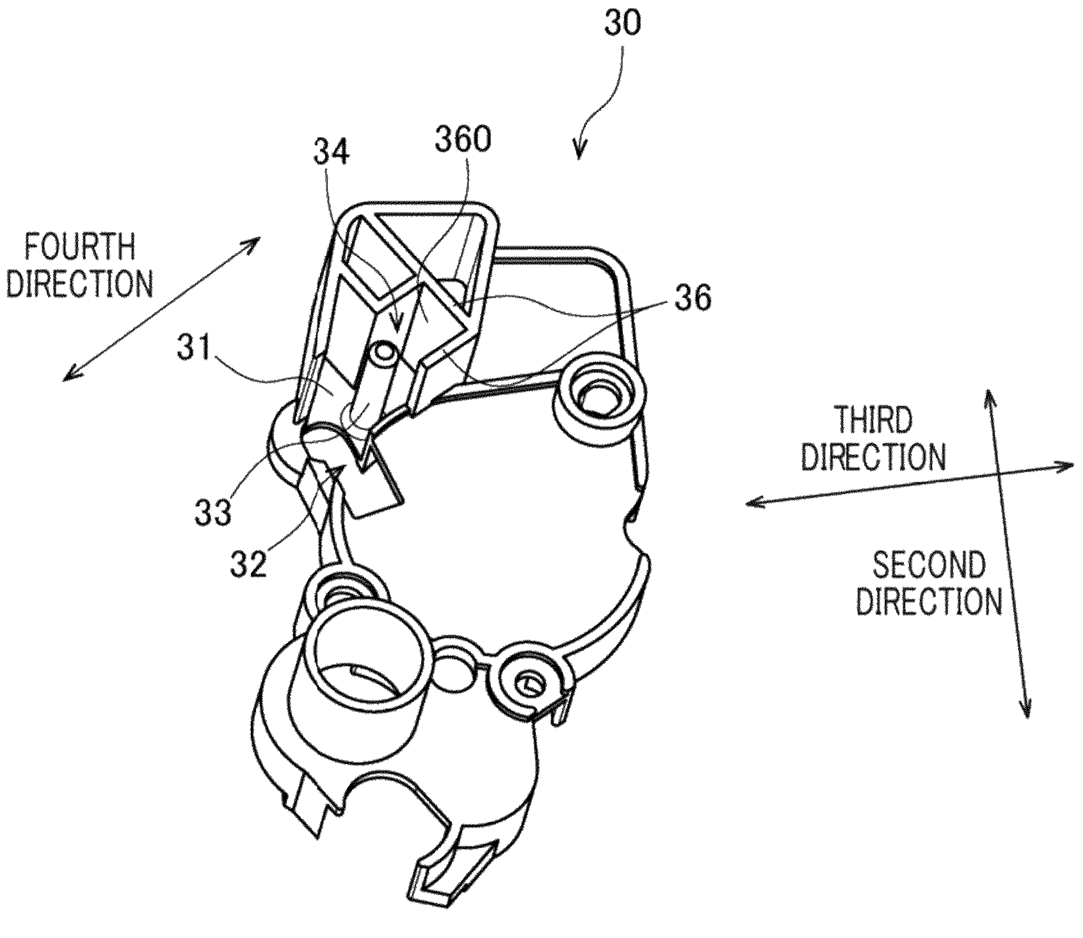
FIG. 6 is a perspective view of a gear cover.
Figure 7:
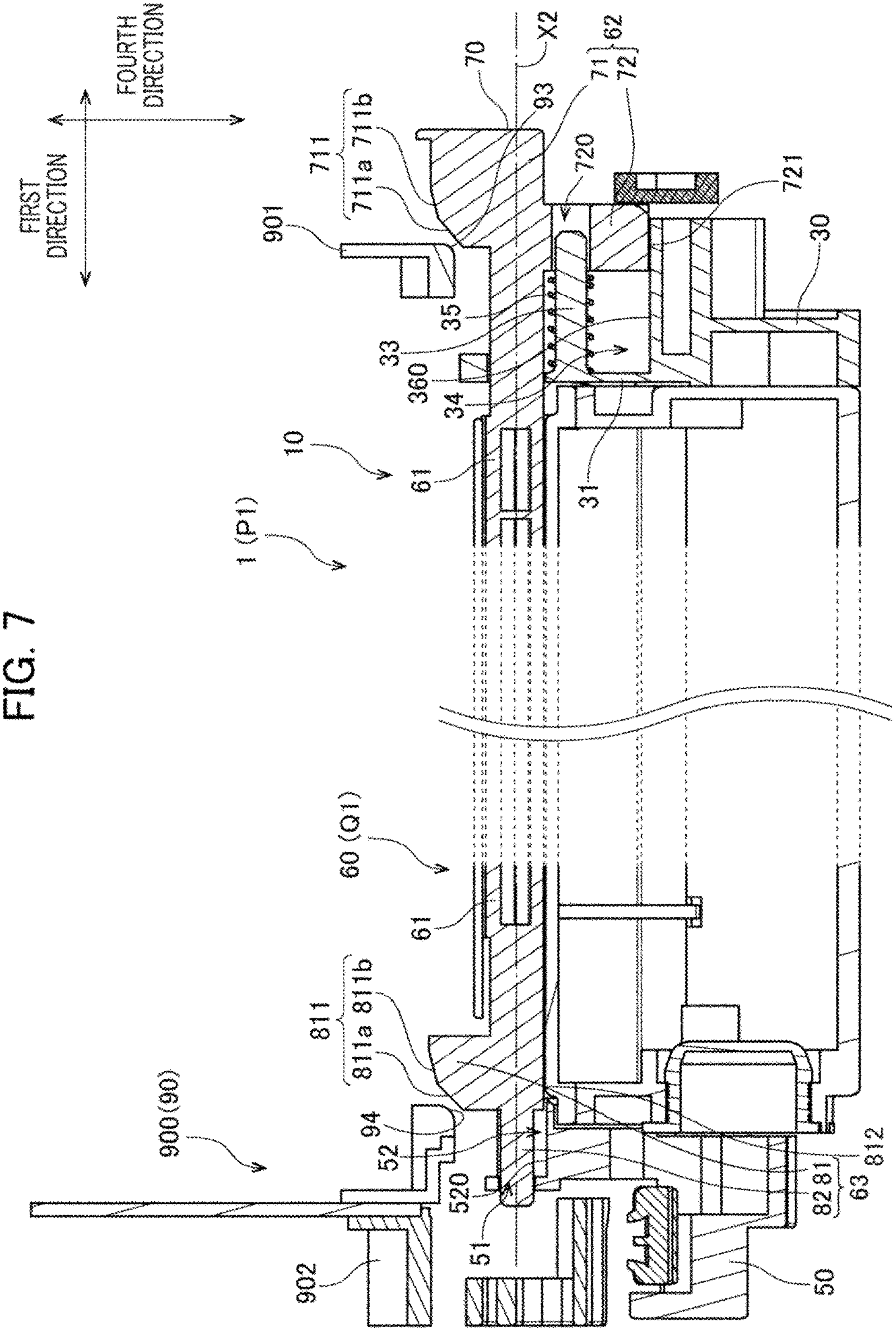
FIG. 7 is a cross-sectional view of the developing cartridge and a frame of a drawer in a contact state.
Figure 8:
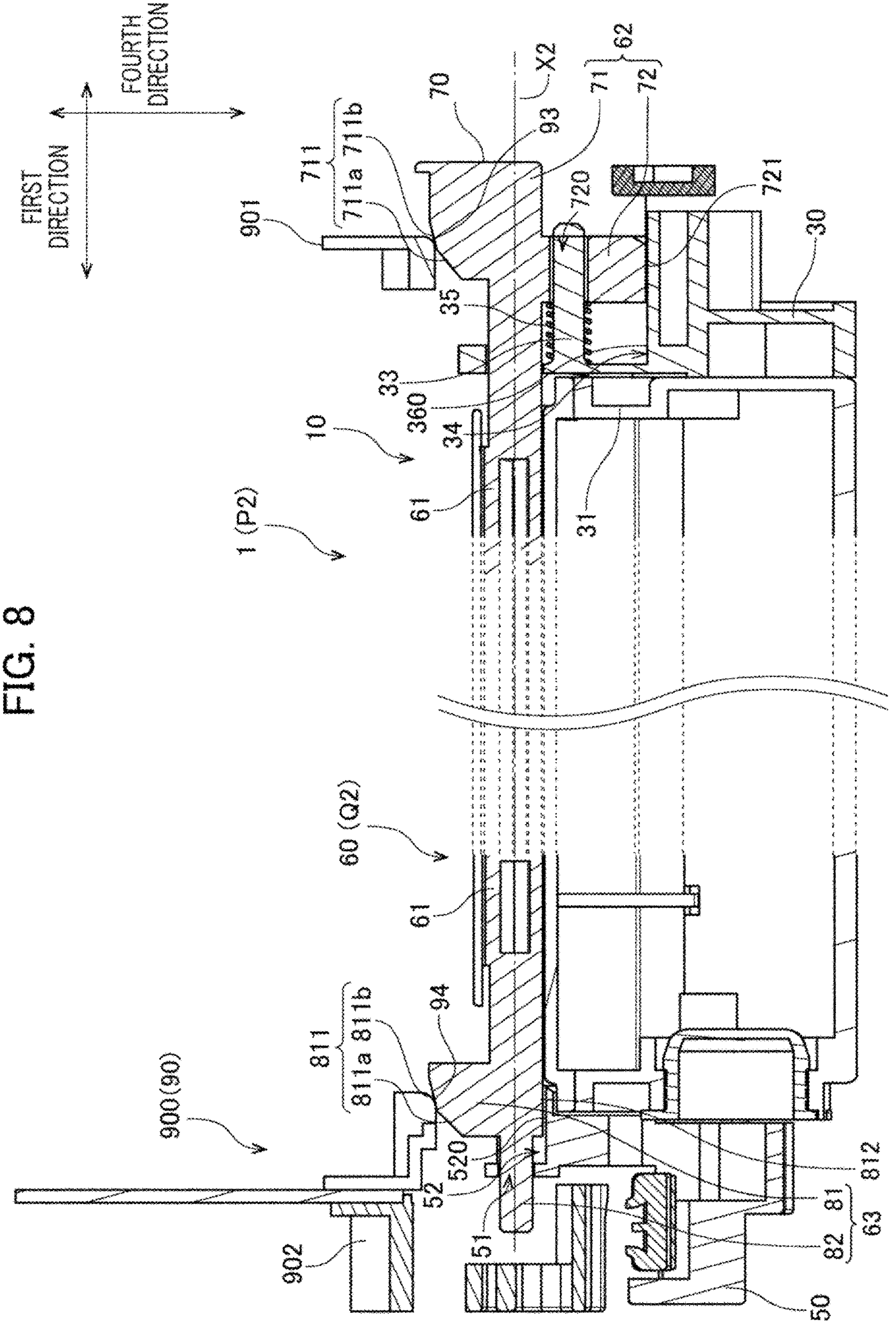
FIG. 8 is a cross-sectional view of the developing cartridge and the frame of the drawer in a separated state.
Figure 9:
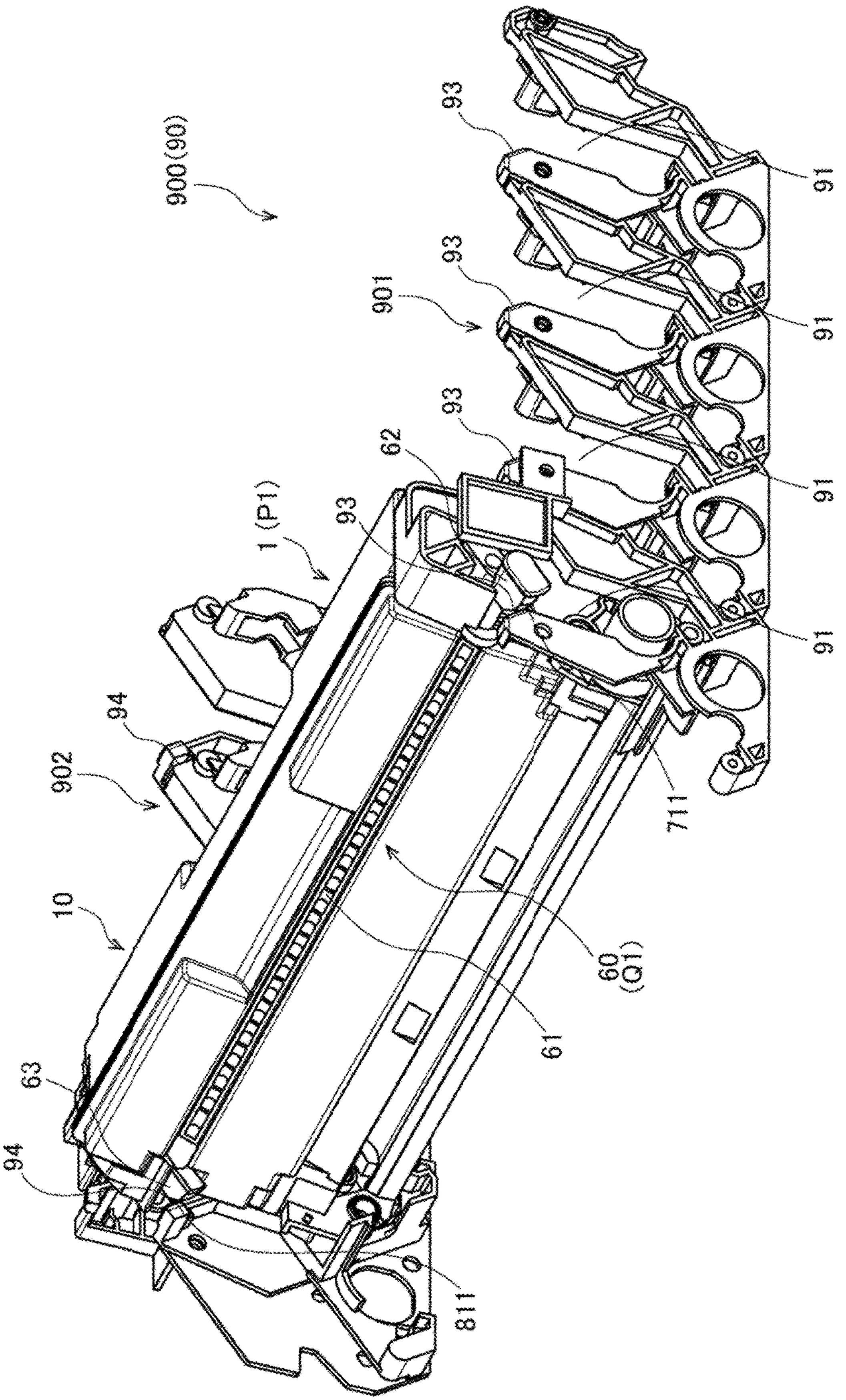
FIG. 9 is a perspective view of the developing cartridge and the frame of the drawer in the contact state.
Figure 10:
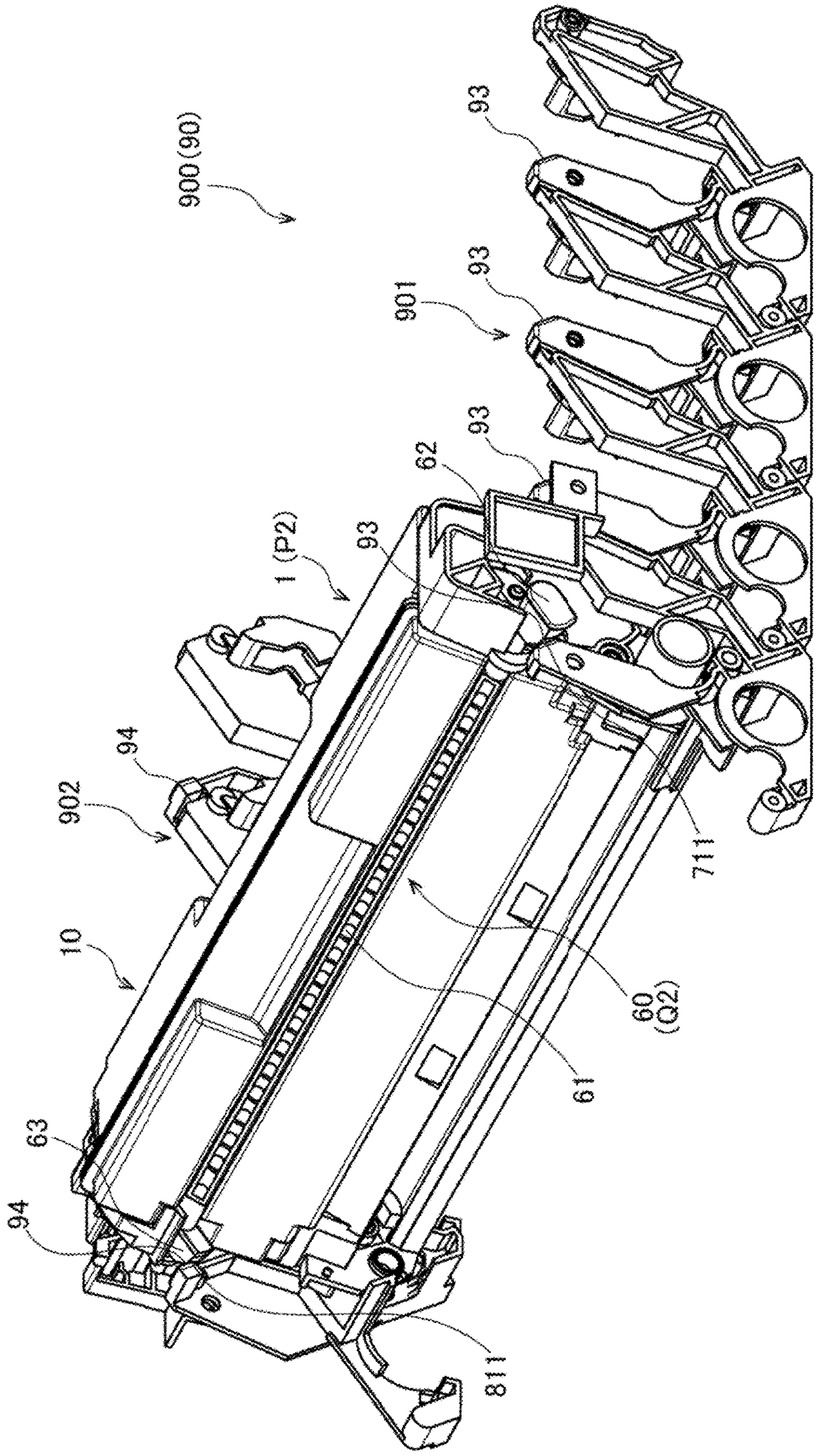
FIG. 10 is a perspective view of the developing cartridge and the frame of the drawer in the separated state.

3. Configuration of Gear Cover, Coil Spring, Holder Cover and Separating Member Next, the configurations of the gear cover 30, the coil spring 35, the holder cover 50 and the separating member 60 will be described in detail with reference to FIGS. 5 through 10. FIG. 5 is an exploded perspective view of the developing cartridge 1. Only the casing 10, the gear cover 30, the IC-chip assembly 40, the holder cover 50 and the separating member 60 are shown in FIG. 5. FIG. 6 is a perspective view of the gear cover 30. FIG. 7 is a cross-sectional view of the developing cartridge 1 and the drawer unit 90 in a contact state. FIG. 8 is a cross-sectional view of the developing cartridge 1 and the drawer unit 90 in a separated state. Note that FIGS. 7 and 8 are cross-sectional views taken along a plane that includes a second axis X2 and extends both in the first direction and in a fourth direction (described later). FIG. 9 is a perspective view of the developing cartridge 1 and the drawer unit 90 in the contact state. FIG. 10 is a perspective view of the developing cartridge 1 and the drawer unit 90 in the separated state. Only one of the four developing cartridges 1 is shown in FIGS. 9 and 10, but the remaining three developing cartridges 1 are not shown. The developing roller 20 is also not shown in FIGS. 9 and 10.

The separating member 60 is a member for switching the state of the image-forming apparatus 100 between the contact state and the separated state. That is, the separating member 60 is a member for moving the casing 10 and the developing roller 20 of the developing cartridge 1 between a contact position P1 and a separated position P2 relative to the drawer unit 90 in a state where the developing cartridge 1 is attached to the drawer unit 90. When the developing cartridge 1 is placed in the contact position P1 in a state where the developing cartridge 1 is attached to the drawer unit 90, the image-forming apparatus 100 enters the contact state in which the developing roller 20 and the photosensitive drum of the drawer unit 90 are in contact with each other. When the developing cartridge 1 is placed in the separated position P2 in a state where the developing cartridge 1 is attached to the drawer unit 90, the image-forming apparatus 100 enters the separated state in which the developing roller 20 and the photosensitive drum of the drawer unit 90 are separated from each other.

When the developing cartridge 1 is attached to the drawer unit 90, the separating member 60 is placed in a first position Q1 relative to the casing 10 as a natural state. At this time, the image-forming apparatus 100 enters the contact state. For entering the separated state, the image-forming apparatus 100 applies a drive force from the body frame 101 to the separating member 60 of the developing cartridge 1. When applied with the drive force, the separating member 60 moves in the first direction relative to the casing 10 to be placed in a second position Q2 relative to the casing 10. As a result, the image-forming apparatus 100 enters the separated state. In the present embodiment, while the image-forming apparatus 100 enters the separated state from the contact state, the developing cartridge 1 moves in a direction from one end side of the casing 10 in the second direction to another end side of the casing 10 in the second direction. Accordingly, the developing roller 20 separates from the photosensitive drum in the second direction that is a separating direction.

As illustrated in FIG. 5, the separating member 60 includes a shaft 61, a first cam 62 and a second cam 63. The separating member 60 is formed of a resin as a single member. In other words, the shaft 61, the first cam 62 and the second cam 63 are integrally formed of a resin. Specifically, the separating member 60 is integrally molded through injection molding. The separating member 60 is movable in the first direction relative to the casing 10 between the first position Q1 illustrated in FIGS. 7 and 9 and the second position Q2 illustrated in FIGS. 8 and 10. The first cam 62 is movable in the first direction together with the shaft 61 and the second cam 63 between the position illustrated in FIGS. 7 and 9 and the position illustrated in FIGS. 8 and 10. The position of the first cam 62 illustrated in FIGS. 8 and 10 is closer to the first outer surface 11 in the first direction than the position of the first cam 62 illustrated in FIGS. 7 and 9 is to the first outer surface 11 in the first direction. The second cam 63 is movable in the first direction together with the shaft 61 and the first cam 62 between the position illustrated in FIGS. 7 and 9 and the position illustrated in FIGS. 8 and 10. The position of the second cam 63 illustrated in FIGS. 8 and 10 is closer to the second outer surface 12 in the first direction than the position of the second cam 63 illustrated in FIGS. 7 and 9 is to the second outer surface 12 in the first direction.

The shaft 61 has a columnar shape extending in the first direction. The shaft 61 has a circular columnar shape. The shaft 61, however, may have a rectangular columnar shape. The shaft 61 is a shaft along the second axis X2 that extends in the first direction. The shaft is movable in the first direction relative to both the casing 10 and the developing roller 20.

The shaft 61 is disposed along an outer surface of the casing 10. More specifically, the casing 10 has a third outer surface 16 and a fourth outer surface 17. The third outer surface 16 and the fourth outer surface 17 are separated from each other in the third direction, which crosses (in the present embodiment, is orthogonal to) both the first direction and the second direction. The third outer surface 16 is positioned at one end portion of the casing 10 in the third direction. The fourth outer surface 17 is positioned at another end portion of the casing 10 in the third direction. The third outer surface 16 has a casing groove 18 extending in the first direction. A portion of the shaft 61 is positioned inside the casing groove 18 of the casing 10.

The first cam 62 is positioned at one end portion of the shaft 61 in the first direction. The first cam 62 is movable in the first direction relative to the casing 10 together with both the shaft 61 and the second cam 63. The first cam 62 includes a first cam body part 71 and a first cam holding part 72. At least a portion of the first cam 62 is positioned opposite the first outer surface 11 relative to the gear cover 30 in the first direction.

The first cam body part 71 extends in the fourth direction. In other words, the first cam body part 71 extends both in the second direction and in the third direction.

The first cam body part 71 has a pressure receiving surface 70 that receives a pressing force from the image-forming apparatus 100. The pressure receiving surface 70 is positioned at one end portion of the first cam body part 71 in the first direction. In the first direction, the one end portion of the first cam body part 71 in the first direction is positioned opposite the second cam 63 relative to another end portion of the first cam body part 71 in the first direction. For switching the image-forming apparatus 100 from the contact state to the separated state, the image-forming apparatus 100 presses the pressure receiving surface 70 in the first direction. More specifically, the image-forming apparatus 100 presses the pressure receiving surface 70 in the first direction from the one end portion of the casing 10 in the first direction toward the another end portion of the casing 10 in the first direction. This operation causes the separating member 60 to move from the first position Q1 to the second position Q2.

The first cam holding part 72 is positioned opposite the first cam body part 71 relative to the shaft 61 in the fourth direction. Hence, the first cam holding part 72 extends from the first cam body part 71 in the fourth direction. In other words, the first cam holding part 72 extends from the first cam body part 71 in a direction from the one end portion of the casing 10 in the second direction toward another end portion of the casing 10 in the second direction. Also, the first cam holding part 72 extends from the first cam body part 71 in the third direction from the third outer surface 16 toward the fourth outer surface 17.

The first cam holding part 72 has a through-hole 720. The through-hole 720 penetrates through the first cam holding part 72 in the first direction. The through-hole 720 is a circular columnar hole.

The second cam 63 is positioned at another end portion of the shaft 61 in the first direction. The second cam 63 is movable in the first direction together with both the shaft 61 and the first cam 62. The second cam 63 includes a second cam body part 81 and a second cam holding part 82.

The second cam body part 81 extends in the fourth direction. In other words, the second cam body part 81 extends both in the second direction and in the third direction. The direction in which the second cam body part 81 extends is the same as the direction in which the first cam body part 71 extends.

The second cam holding part 82 extends from the second cam body part 81 in the first direction. The second cam holding part 82 extends from the second cam body part 81 in the first direction from the outer surface 11 toward the outer surface 12. The second cam holding part 82 has a circular columnar shape.

As illustrated in FIG. 6, the gear cover 30 includes a cover part 31 and a columnar part 33, and has a hole 32 and a first guide groove 34.

The cover part 31 extends along the first outer surface 11. The cover part 31 extends both in the second direction and in the third direction. The cover part 31 covers the first outer surface 11 and a plurality of gears (not shown) that are positioned at the first outer surface 11.

The hole 32 is a through-hole that penetrates through the cover part 31 in the first direction. The shaft 61 and the second cam 63 of the separating member 60 can be inserted into the hole 32. The shaft 61 is held by the cover part 31 by the shaft 61 being inserted into the hole 32. In an assembly process of the developing cartridge 1, the second cam 63 is passed through the hole 32, so that the shaft 61 is disposed inside the hole 32.

The columnar part 33 has a circular columnar shape extending from the cover part 31 in the first direction. The coil spring 35 is mounted on the outer periphery of the columnar part 33. The coil spring 35 is positioned outward of the shaft 61 in the radial direction of the shaft 61. The coil spring 35 is positioned between the first outer surface 11 and the first cam 62 in the first direction. The coil spring 35 is positioned between the first outer surface 11 and the first cam 62 in a state where the coil spring 35 is at its natural length or compressed from the natural length. The columnar part 33 is inserted in the through-hole 720 of the first cam holding part 72. The through-hole 720 has a diameter that is smaller than the diameter of the coil spring 35. Accordingly, the coil spring 35 is held between the first outer surface 11 and the first cam holding part 72 in the first direction.

The coil spring 35 can expand and contract in the first direction between a first length and a second length that is shorter than the first length. The coil spring 35 is an example of the elastic member. When the separating member 60 is placed at the first position Q1, the coil spring 35 has the first length illustrated in FIG. 7. When the pressure receiving surface 70 receives a pressing force from the image-forming apparatus 100, the separating member 60 moves from the first position Q1 to the second position Q2. Accordingly, the coil spring 35 is compressed to have the second length as illustrated in FIG. 8. When the pressing force applied to the pressure receiving surface 70 from the image-forming apparatus 100 is released, the length of the coil spring 35 is returned to the first length from the second length. Hence, the separating member 60 moves back to the first position Q1 from the second position Q2. In this way, the separating member 60 is movable in the first direction relative to the casing 10 by the pressing force applied in the first direction and the elastic force of the coil spring 35.

The first guide groove 34 is a groove extending from the cover part 31 in the first direction. The first guide groove 34 has a wall portion 36. In other words, the first guide groove 34 is defined by the wall portion 36. The inner circumferential surface of the wall portion 36 has a squared U-shape when viewed along the first direction. The first cam holding part 72 of the first cam 62 is inserted in the first guide groove 34. While the separating member 60 moves in the first direction, the first cam holding part 72 moves in the first direction along the first guide groove 34. Accordingly, the position of the first cam 62 can be suppressed from shifting relative to the casing 10 during movement of the separating member 60 between the first position Q1 and the second position Q2. In this way, the gear cover 30 has the first guide groove 34 for guiding movement of the first cam 62 in the first direction.

As illustrated in FIG. 5, the holder cover 50 has a holding hole 51 and a second guide groove 52.

The holding hole 51 is a hole penetrating through the holder cover 50 in the first direction. The second cam holding part 82 of the second cam 63 is inserted in the holding hole 51. Accordingly, the holder cover 50 holds the second cam 63.

The second guide groove 52 is a groove extending in the first direction. The second cam body part 81 of the second cam 63 is inserted in the second guide groove 52. While the separating member 60 moves in the first direction, the second cam body part 81 moves in the first direction along the second guide groove 52. Accordingly, the position of the second cam 63 can be suppressed from shifting relative to the casing 10 during movement of the separating member 60 between the first position Q1 and the second position Q2. In this way, the holder cover 50 has the second guide groove 52 for guiding movement of the second cam 63 in the first direction.

The first cam body part 71 of the first cam 62 has a first inclined surface 711. In the present embodiment, the first inclined surface 711 is positioned at a portion of a peripheral surface of the shaft 61 as illustrated in FIG. 3. The first inclined surface 711 is inclined relative to the shaft 61 extending in the first direction. The first inclined surface 711 is part of a conical surface centered on the second axis X2. As illustrated in FIGS. 3, 7 and 8, the first inclined surface 711 includes a first inclined part 711*a* and a second inclined part 711*b*. The inclination angle of the second inclined part 711*b* relative to the shaft 61 is smaller than the inclination angle of the first inclined part 711*a* relative to the shaft 61. The first inclined part 711*a* is closer to the first outer surface 11 in the first direction than the second inclined part 711*b* is to the first outer surface 11 in the first direction. Note that the coil spring 35 is positioned opposite the first inclined surface 711 relative to the shaft 61.

Accordingly, the first inclined surface 711 is closer to the developing roller 20 in the second direction as extending in a direction from the another end portion of the shaft 61 in the first direction toward the one end portion of the shaft 61 in the first direction. Hence, the first inclined surface 711 is inclined so as to approach the one end portion of the casing 10 in the second direction from the another end portion of the casing 10 in the second direction as extending in a direction from the another end portion of the shaft 61 in the first direction toward the one end portion of the shaft 61 in the first direction. Differently stated, the first inclined surface 711 extends more outwardly in the radial direction of the shaft 61 and a distance between the shaft 61 and the first inclined surface 711 in the second direction is greater as the first inclined surface 711 extends in the direction from the another end portion of the shaft 61 in the first direction toward the one end portion of the shaft 61 in the first direction. That is, the distance between the shaft 61 and the first inclined surface 711 in the second direction is gradually increases in the direction from the another end portion of the shaft 61 in the first direction toward the one end portion of the shaft 61 in the first direction.

The first cam holding part 72 of the first cam 62 has a first contact surface 721 as illustrated in FIGS. 7 and 8. The first contact surface 721 is positioned opposite the first cam body part 71 relative to the shaft 61 in the fourth direction. The first contact surface 721 is orthogonal to the fourth direction. The first contact surface 721 is also orthogonal to the radial direction of the shaft 61.

The first guide groove 34 has a first receiving surface 360. In other words, the wall portion 36 has the first receiving surface 360. The first receiving surface 360 is part of the wall portion 36 of the first guide groove 34. The first contact surface 721 faces the first receiving surface 360 in the fourth direction. The surface of the wall portion 36 that faces the first contact surface 721 will be called the first receiving surface 360. The area of the region in which the first contact surface 721 and the first receiving surface 360 face each other when the separating member 60 is in the first position Q1 is smaller than when the separating member 60 is in the second position Q2. In other words, the area of the portion of the first contact surface 721 that faces the first receiving surface 360 when the separating member 60 is in the first position Q1 is smaller than when the separating member 60 is in the second position Q2. The first receiving surface 360 faces the first cam 62 in the radial direction of the shaft 61 when the first cam 62 is in the position illustrated in FIGS. 8 and 10, i.e., when the separating member 60 is in the second position Q2.

The second cam body part 81 of the second cam 63 has a second inclined surface 811. In the present embodiment, the second inclined surface 811 is positioned at a portion of a peripheral surface of the shaft 61 as illustrated in FIG. 3. The second inclined surface 811 is inclined relative to the shaft 61 extending in the first direction. The second inclined surface 811 is inclined relative to the shaft 61 in the same manner as the first inclined surface 711. As illustrated in FIGS. 3, 7 and 8, the second inclined surface 811 is part of a conical surface centered on the second axis X2. The second inclined surface 811 has a third inclined part 811*a* and a fourth inclined part 811*b*. The inclination angle of the fourth inclined part 811*b* relative to the shaft 61 is smaller than the inclination angle of the third inclined part 811*a* relative to the shaft 61. The third inclined part 811*a* is farther from the second outer surface 12 in the first direction than the fourth inclined part 811*b* is from the second outer surface 12.

Accordingly, the second inclined surface 811 is closer to the developing roller 20 in the second direction as extending in a direction from the another end portion of the shaft 61 in the first direction toward the one end portion of the shaft 61 in the first direction. Hence, the second inclined surface 811 is inclined so as to approach the one end portion of the casing 10 in the second direction from the another end portion of the casing 10 in the second direction as extending in a direction from the another end portion of the shaft 61 in the first direction toward the one end portion of the shaft 61 in the first direction.

The second cam body part 81 of the second cam 63 has a second contact surface 812 as illustrated in FIGS. 7 and 8. The second contact surface 812 is positioned opposite the second inclined surface 811 relative to the shaft 61 in the fourth direction. The second contact surface 812 is orthogonal to the fourth direction. The second contact surface 812 is also orthogonal to the radial direction of the shaft 61.

The second guide groove 52 has a second receiving surface 520. In other words, the second receiving surface 520 is part of the second guide groove 52. The second contact surface 812 faces the second receiving surface 520 in the fourth direction. The area of the region in which the second contact surface 812 and the second receiving surface 520 face each other when the separating member 60 is in the first position Q1 is smaller than when the separating member 60 is in the second position Q2. In other words, the area of the portion of the second contact surface 812 that faces the second receiving surface 520 when the separating member 60 is in the first position Q1 is smaller than when the separating member 60 is in the second position Q2. The second receiving surface 520 faces the second cam 63 in the radial direction of the shaft 61 when the second cam 63 is in the position illustrated in FIGS. 8 and 10, i.e., when the separating member 60 is in the second position Q2.

The first cam 62 and the second cam 63 are movable in the first direction together with the shaft 61. When the separating member 60 moves from the first position Q1 as illustrated in FIGS. 7 and 9 to the second position Q2 as illustrated in FIGS. 8 and 10 in the first direction, the first cam 62 approaches both the first outer surface 11 of the casing 10 and the cover part 31 of the gear cover 30 while the second cam 63 separates from the first outer surface 11.

4. Separation Operation by Separating Member 60

Next, a description will be given of how the image-forming apparatus 100 operates in switching between the contact state and the separated state.

The frame 900 of the drawer unit 90 includes the four slots 91 as illustrated in FIGS. 9 and 10. The frame 900 of the drawer unit 90 further includes a first side frame 901 and a second side frame 902 as illustrated in FIGS. 8 through 10. The first side frame 901 and the second side frame 902 are positioned apart from each other in the first direction. The photosensitive drums 92 are positioned between the first side frame 901 and the second side frame 902 in the first direction. When the developing cartridges 1 are attached in the slots 91 of the drawer unit 90, the developing cartridges 1 are positioned between the first side frame 901 and the second side frame 902 in the first direction. Then, the first outer surfaces 11 of the developing cartridges 1 face the first side frame 901 in the first direction. Also, when the developing cartridges 1 are attached in the slots 91 of the drawer unit 90, the second outer surfaces 12 of the developing cartridges 1 face the second side frame 902 in the first direction.

The first side frame 901 has four first cam receiving surfaces 93. The second side frame 902 has four second cam receiving surfaces 94. In a state where the developing cartridges 1 are attached in the slots 91, each of the first cam receiving surfaces 93 faces the first inclined surface 711 of the first cam 62 of the corresponding developing cartridge 1 both in the first direction and in the fourth direction. In a state where the developing cartridges 1 are attached to the slots 91, each of the second cam receiving surfaces 94 faces the second inclined surface 811 of the second cam 63 of the corresponding developing cartridge 1 both in the first direction and in the fourth direction.

For switching from the contact state to the separated state, the image-forming apparatus applies a pressing force to the pressure receiving surface 70 of the first cam 62 in the first direction. In other words, for switching from the contact state to the separated state, the image forming apparatus 100 applies a pressing force to the pressure receiving surface 70 of the first cam 62 in a direction from the one end portion of the casing 10 in the first direction toward the another end portion of the casing 10 in the first direction. By this operation, the separating member 60 moves from the first position Q1 to the second position Q2. Hence, the first inclined surface 711 of the first cam 62 comes into contact with the first cam receiving surfaces 93 of the frame 900 of the drawer unit 90 while the second inclined surface 811 of the second cam 63 comes into contact with the second cam receiving surfaces 94 of the frame 900. As a result, the separating member 60 rides up on both the first cam receiving surface 93 and the second cam receiving surface 94 of the frame 900, and the developing roller 20 separates from the photosensitive drum 92 in the second direction. In this way, the casing 10 of the developing cartridge 1 moves in the second direction from the contact position P1 where the developing roller 20 and the photosensitive drum 92 are in contact with each other to the separated position P2 where the developing roller 20 and the photosensitive drum 92 are in separation from each other.

At this time, the first inclined surface 711 of the first cam 62 comes into contact with the first cam receiving surfaces 93. Also, the first inclined surface 711 of the first cam 62 moves in the first direction. As described above, the first inclined surface 711 extends more outwardly in the radial direction of the shaft 61 as extending in a direction from the second cam 63 toward the first cam 62 in the first direction. Accordingly, when the first cam 62 moves in the first direction, the first inclined surface 711 in contact with the first cam receiving surface 93 moves away from the shaft 61 in the radial direction of the shaft 61. The first inclined surface 711 and the first cam receiving surfaces 93 face each other in the second direction. Hence, while moving in the first direction, the first inclined surface 711 moves also in a direction away from the first cam receiving surface 93 in the second direction.

Similarly, the second inclined surface 811 of the second cam 63 comes into contact with the second cam receiving surface 94. Also, the second inclined surface 811 of the second cam 63 moves in the first direction. As described above, the second inclined surface 811 extends more outwardly in the radial direction of the shaft 61 as extending in a direction from the second cam 63 toward the first cam 62 in the first direction. Accordingly, when the second cam 63 moves in the first direction, the second inclined surface 811 in contact with the second cam receiving surface 94 moves away from the shaft 61 in the radial direction of the shaft 61. The second inclined surface 811 and the second cam receiving surface 94 face each other in the second direction. Hence, while moving in the first direction, the second inclined surface 811 moves also in a direction away from the second cam receiving surface 94 in the second direction.

Since the first cam 62 and the second cam 63 move in the second direction while moving in the first direction, the separating member 60 also moves in the second direction while moving in the first direction. While the separating member 60 moves in the second direction, the casing 10 and the developing roller 20 also move in the second direction. This movement places the developing roller 20 in the separated position P2, which is separated from the photosensitive drum 92 in the second direction. That is, the image forming apparatus 100 enters the separated state.

When the image forming apparatus 100 is in the separated state, the separating member 60 supports a load from the developing cartridge 1. At this time, the first contact surface 721 of the first cam 62 is in contact with the first receiving surface 360 of the first guide groove 34 of the gear cover 30 while the second contact surface 812 of the second cam 63 is in contact with the second receiving surface 520 of the holder cover 50. Accordingly, the first cam 62 and the second cam 63 support the developing cartridge 1 through the gear cover 30 and the holder cover 50. In this way, the first cam 62 and the second cam 63 support the developing cartridge 1 in the separated state. Hence, the load applied to the shaft 61 can be reduced, thereby suppressing the shaft 61 from being deformed.

For switching from the separated state to the contact state, the image forming apparatus 100 releases the pressing force being applied to the pressure receiving surface 70 of the first cam 62 from the image forming apparatus 100. When the pressing force being applied to the pressure receiving surface 70 of the first cam 62 is released, the length of the coil spring 35 expands from the second length to the first length. Accordingly, the separating member 60 moves from the second position Q2 to the first position Q1.

While the separating member 60 moves from the second position Q2 to the first position Q1, the first inclined surface 711 of the first cam 62 moves in a direction toward the first cam receiving surfaces 93 in the second direction and the second inclined surface 811 of the second cam 63 moves in a direction toward the second cam receiving surfaces 94 in the second direction. These movements cause the casing 10 and the developing roller 20 to move in the second direction, so that the developing roller 20 approaches the photosensitive drum 92 in the second direction. Then, the surface of the developing roller 20 comes into contact with the surface of the photosensitive drum 92. In other words, the casing 10 and the developing roller 20 of the developing cartridge 1 is placed in the contact position P1. Differently stated, the image forming apparatus 100 enters the contact state.

For separating the developing roller 20 and the photosensitive drum 92 from each other in the contact state, there is a need to move the first cam 62 and the second cam 63 from the first position Q1 to the second position Q2. If the shaft 61, the first cam 62 and the second cam 63 were each configured as a separate member, there would occur manufacturing errors in each member or dimensional errors due to the assembly of the members. For example, if the shaft 61 were made of a metal and the first cam 62 were made of a resin, there would be a need to estimate the dimensional error between the shaft 61 and the first cam 62 to be larger because the shaft 61 and the first cam 62 would be different in their coefficient of linear thermal expansion.

According to the present embodiment, the shaft 61 and the first cam 62 of the separating member 60 are integrally formed, thereby enabling to reduce the dimensional error between the shaft 61 and the first cam 62. Also, the shaft 61, the first cam 62 and the second cam 63 of the separating member 60 are integrally formed, and hence, the dimensional errors among the shaft 61, the first cam 62 and the second cam 63 can be reduced. This configuration can shorten the moving stroke of the separating member 60 from the first position Q1 to the second position Q2.

5. Modifications

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the above-described embodiment, the shaft 61, the first cam 62 and the second cam 63 of the separating member 60 are integrally formed. However, the shaft 61 and the first cam 62 may be integrally formed but the second cam 63 may not be included therein. In other words, the second cam 63 may be formed as a separate member from the member integrally formed of the shaft 61 and the first cam 62.

In the above-described embodiment, the separating member 60 includes the first cam 62 and the second cam 63. The separating member 60, however, need only include at least one of the first cam 62 and the second cam 63. In addition, the separating member 60 need only include at least one of the first inclined surface 711 and the second inclined surface 811.

In the above-described embodiment, the holding hole 51 of the second cam holding part 82 is a through-hole. However, the holding hole 51 may be a recessed portion rather than a through-hole. The holding hole 51 may be positioned closer to the first cam 62 in the first direction than the second cam 63 is to the first cam 62 in the first direction. In this case, the shaft 61 is disposed in the holding hole 51 and the holder cover 50 holds the shaft 61.

In the above-described embodiment, the first inclined surface 711 of the first cam 62 is part of a conical surface. However, the first inclined surface 711 may be part of a polygonal pyramid surface. Further, the first inclined surface 711 is a smoothly inclined surface. However, the first inclined surface 711 may have protrusions and recessed portions, such as steps. Alternatively, the first inclined surface 711 may have a curved shape.

In the above-described embodiments, the second inclined surface 811 of the second cam 63 is part of a conical surface. However, the second inclined surface 811 may be part of a polygonal pyramid surface. Further, the second inclined surface 811 is a smoothly inclined surface. However, the second inclined surface 811 may have protrusions and recessed portions, such as steps. Alternatively, the second inclined surface 811 may have a curved shape.

Although the coil spring 35 has been described as an example of the elastic member in the above-described embodiment, the elastic member is not limited to the coil spring 35. For example, a member having elasticity, such as a flat spring, a torsion spring, a rubber, a sponge, or the like can be employed as the elastic member.

Further, the components appearing in the present embodiment and the modifications may be combined as desired to the extent that no contradictions occur.

What is claimed is:

1. A developing cartridge comprising:

a housing configured to accommodate developer therein, the housing having a first outer surface, the first outer surface being positioned at one end portion of the housing in a first direction;

a developing roller rotatable about a first axis extending in the first direction;

a shaft extending in the first direction, the shaft being movable in the first direction relative to both the housing and the developing roller;

a first cam positioned at one end portion of the shaft in the first direction, the first cam being movable in the first direction together with the shaft, the first cam having a first inclined surface; and an elastic member configured to be expanded or compressed, the entire elastic member being positioned farther from the first inclined surface in a radial direction of the shaft than the shaft is from the first inclined surface in the radial direction, the elastic member being positioned between the first outer surface and the first cam in the first direction.

2. The developing cartridge according to claim 1, wherein the developing roller is positioned at one end portion of the housing in a second direction, wherein one side portion of a circumferential surface of the developing roller in the second direction is exposed to an outside of the housing, and wherein another side portion of the circumferential surface of the developing roller in the second direction is positioned inside the housing.

3. The developing cartridge according to claim 1, wherein the developing roller is positioned at one end portion of the housing in a second direction, and wherein a distance between the shaft and the first inclined surface in the second direction gradually increases in a direction from another end portion of the shaft in the first direction toward the one end portion of the shaft in the first direction.

4. The developing cartridge according to claim 1, wherein the elastic member is positioned between the first outer surface and the first cam in a state where the elastic member is at a natural length of the elastic member or compressed from the natural length.

5. The developing cartridge according to claim 4, wherein the elastic member is positioned opposite the first inclined surface relative to the shaft.

6. The developing cartridge according to claim 1, further comprising:

a gear cover positioned at the first outer surface, the gear cover covering at least a portion of the first outer surface, wherein at least a portion of the first cam is positioned opposite the first outer surface relative to the gear cover in the first direction.

7. The developing cartridge according to claim 6, wherein the housing has a groove extending in the first direction, and wherein a portion of the shaft is positioned inside the groove.

8. The developing cartridge according to claim 7, wherein the gear cover has a hole in which the shaft is inserted.

9. The developing cartridge according to claim 6, wherein the gear cover has a first guide groove for guiding movement of the first cam in the first direction.

10. The developing cartridge according to claim 9, wherein the first cam is movable in the first direction together with the shaft between a first position and a second position that is closer to the first outer surface than the first position is to the first outer surface in the first direction, and wherein the first guide groove has a first receiving surface facing the first cam in the radial direction of the shaft in a state where the first cam is in the second position.

11. The developing cartridge according to claim 1, further comprising:

a second cam positioned at another end portion of the shaft in the first direction, the second cam being movable in the first direction together with both the shaft and the first cam, the second cam being formed integrally with both the shaft and the first cam, the second cam having a second inclined surface.

12. The developing cartridge according to claim 11, wherein the shaft, the first cam, and the second cam are integrally formed of a resin.

13. The developing cartridge according to claim 11, wherein the housing has a second outer surface positioned apart from the first outer surface in the first direction, and wherein the developing cartridge further comprises:

a storage medium having an electrical contact surface;

a holder holding the electrical contact surface, the holder being positioned at the second outer surface, the holder being movable relative to the housing together with the electrical contact surface; and a holder cover covering at least a portion of the holder, the holder cover having a hole in which the shaft or the second cam is inserted in the first direction.

14. The developing cartridge according to claim 13, wherein the holder cover has a second guide groove for guiding movement of the second cam in the first direction.

15. The developing cartridge according to claim 14, wherein the second cam is movable in the first direction together with both the shaft and the first cam between a first position and a second position that is closer to the second outer surface than the first position is to the second outer surface in the first direction, and wherein the second guide groove has a second receiving surface facing the second cam in the radial direction of the shaft in a state where the second cam is in the second position.

16. The developing cartridge according to claim 11, wherein the developing roller is positioned at one end portion of the housing in a second direction, and wherein the second inclined surface is inclined so as to be closer to the developing roller in the second direction as extending in a direction from the another end portion of the shaft in the first direction toward the one end portion of the shaft in the first direction.

17. The developing cartridge according to claim 1, wherein the shaft and the first cam are integrally formed of a resin.

18. The developing cartridge according to claim 1, wherein the developing roller is positioned at one end portion of the housing in a second direction, and wherein the first inclined surface is inclined so as to be closer to the developing roller in the second direction as extending in a direction from another end portion of the shaft in the first direction toward the one end portion of the shaft in the first direction.

* * * * *